(12) United States Patent
Larsson-Fritz

(10) Patent No.: US 11,752,560 B2
(45) Date of Patent: Sep. 12, 2023

(54) CUTTING INSERT AND A METHOD OF MANUFACTURING A CUTTING INSERT

(71) Applicant: SECO TOOLS AB, Fagersta (SE)

(72) Inventor: Stefan G. Larsson-Fritz, Fagersta (SE)

(73) Assignee: SECO TOOLS AB, Fagersta (SE)

( * ) Notice: Subject to any disclaimer, the term of this patent is extended or adjusted under 35 U.S.C. 154(b) by 489 days.

(21) Appl. No.: 16/627,634

(22) PCT Filed: May 28, 2018

(86) PCT No.: PCT/EP2018/063866
§ 371 (c)(1),
(2) Date: Dec. 30, 2019

(87) PCT Pub. No.: WO2019/001861
PCT Pub. Date: Jan. 3, 2019

(65) Prior Publication Data
US 2021/0146451 A1     May 20, 2021

(30) Foreign Application Priority Data
Jun. 30, 2017   (EP) ..................................... 17178933

(51) Int. Cl.
*B23B 27/16*  (2006.01)
*B23B 27/18*  (2006.01)
*B23B 27/14*  (2006.01)

(52) U.S. Cl.
CPC ......... *B23B 27/1611* (2013.01); *B23B 27/143* (2013.01); *B23B 27/18* (2013.01)

(58) Field of Classification Search
CPC ....... B23B 27/143; B23B 27/14; B23B 27/22; B23B 27/1607; B23B 27/20;
(Continued)

(56) References Cited

U.S. PATENT DOCUMENTS 5,006,020 A * 4/1991 Roos ..................... B23B 27/145
407/120
5,056,963 A * 10/1991 Kameno ............... B23B 27/145
29/90.01

(Continued)

FOREIGN PATENT DOCUMENTS

CN       101107088 A     1/2008
CN       101218052 A     7/2008
(Continued)

OTHER PUBLICATIONS

JP 2006-095620 Machine Translation, pp. 3-6 (Year: 2022).*
Machine Translation of JP 2007-190633 A. (Year: 2023).*

*Primary Examiner* — Nicole N Ramos
(74) *Attorney, Agent, or Firm* — Corinne R. Gorski

(57) ABSTRACT

A cutting insert for a cutting tool includes a cutting edge of PCBN or PCD formed in a corner region in a transition between a side surface and a chamfer formed in an upper side of the cutting insert. A chip breaker is formed in the chamfer inside of the cutting edge, extending between a lower chamfer portion and an upper chamfer portion. The chip breaker includes a chip breaker bottom connected to the lower chamfer portion and a chip breaker wall extending from the upper chamfer portion to the chip breaker bottom. An upper transition is formed between the upper chamfer portion and the chip breaker wall. As seen in a top view, the upper transition follows a smoothly curved path including a convex middle portion. As seen in cross-section, perpendicular to the cutting edge, the chip breaker wall and the chip breaker bottom form a smooth concave profile.

13 Claims, 8 Drawing Sheets

(58) Field of Classification Search
CPC ............ B23B 27/1618; B23B 27/1637; B23B 27/1648; B23B 27/141; B23B 2226/125; B23B 2200/321
See application file for complete search history.

(56) References Cited

U.S. PATENT DOCUMENTS

| | | | | |
|---|---|---|---|---|
| 5,226,761 A | * | 7/1993 | Satran | ................... B23B 27/141 407/116 |
| 5,372,463 A | * | 12/1994 | Takahashi | ............. B23B 27/143 407/115 |
| 5,456,557 A | * | 10/1995 | Bernadic | ............... B23B 27/143 407/115 |
| 5,584,616 A | * | 12/1996 | Katbi | ................... B23B 27/143 407/2 |
| 5,676,496 A | * | 10/1997 | Littecke | .................. B23P 15/28 51/293 |
| 5,947,651 A | * | 9/1999 | Murakami | ............ B23B 27/143 407/115 |
| 7,407,348 B2 | * | 8/2008 | Sjogren | ................. B23B 27/145 407/119 |
| 7,429,152 B2 | * | 9/2008 | Oles | ...................... B23B 27/148 407/115 |
| 7,524,148 B2 | * | 4/2009 | Okita | .................... B23B 27/143 407/115 |
| 7,758,287 B2 | * | 7/2010 | Alm | ........................ B23C 5/202 407/115 |
| 7,765,902 B2 | * | 8/2010 | Kuroda | ................ B23D 35/002 407/119 |
| 2005/0076755 A1 | | 4/2005 | Zimmerman et al. | |
| 2012/0128438 A1 | | 5/2012 | Tanaka et al. | |
| 2012/0230785 A1 | * | 9/2012 | Chen | .................... B23B 27/141 407/114 |
| 2015/0239050 A1 | * | 8/2015 | Hirano | ................... B22F 7/062 407/115 |
| 2018/0009040 A1 | * | 1/2018 | Sasaki | .................... B23B 27/22 |

FOREIGN PATENT DOCUMENTS

| | | |
|---|---|---|
| DE | 19856931 A1 | 6/2000 |
| JP | 01252307 A * | 10/1989 |
| JP | H08115702 A | 6/1996 |
| JP | 2006095620 A * | 4/2006 |
| JP | 2006187813 A * | 7/2006 |
| JP | 2007190633 A * | 8/2007 |
| JP | 2008200831 A * | 9/2008 |
| JP | 2008207273 A * | 9/2008 |
| WO | 2008093592 A1 | 8/2008 |

* cited by examiner

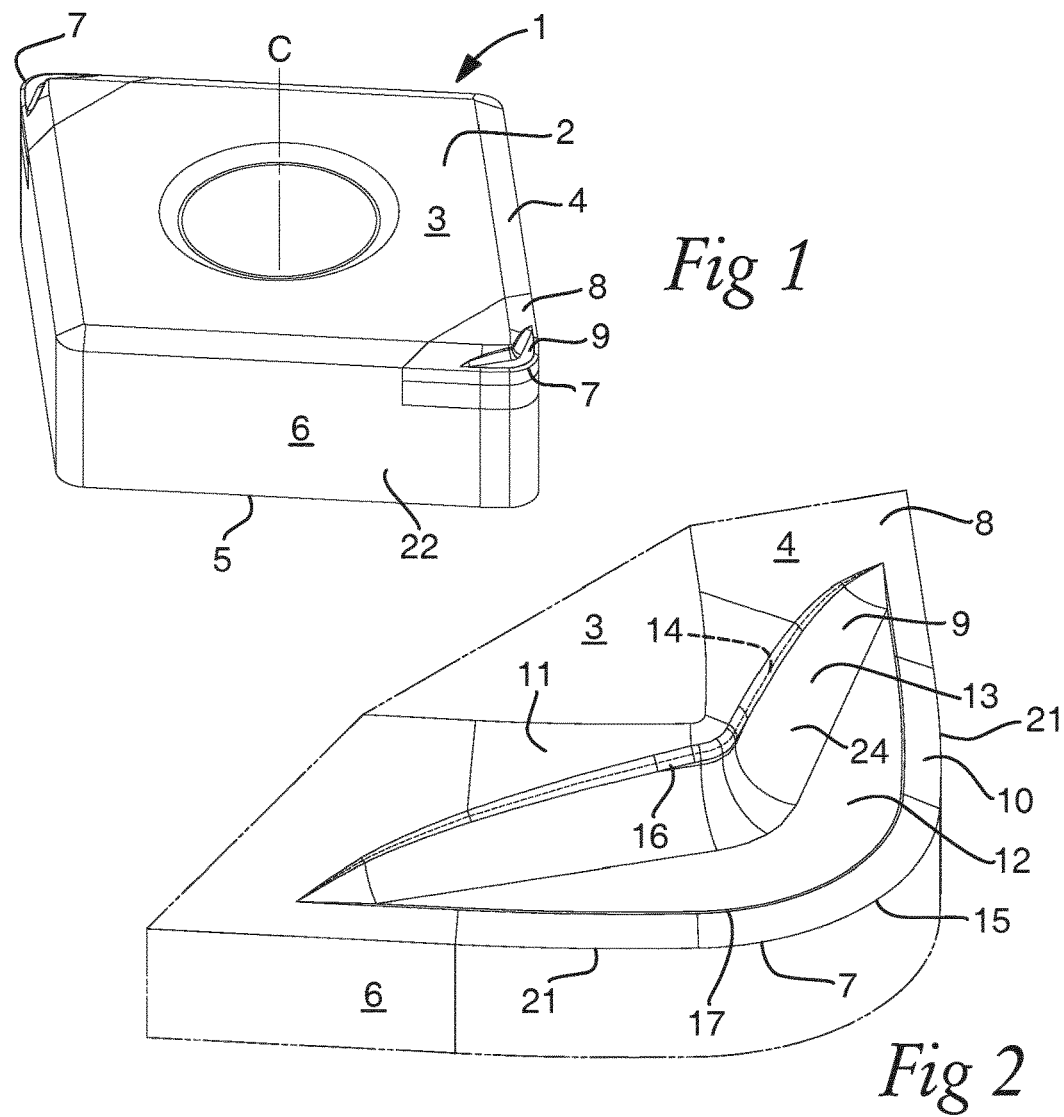
*Fig 1*
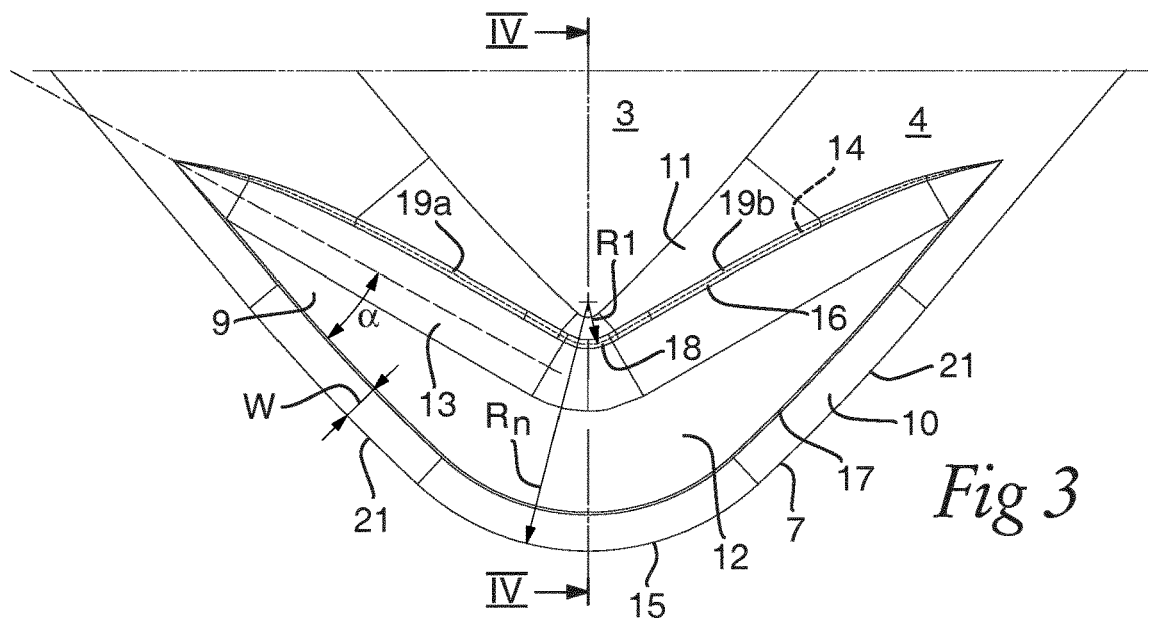
*Fig 2*
*Fig 3*

CUTTING INSERT AND A METHOD OF MANUFACTURING A CUTTING INSERT

RELATED APPLICATION DATA

This application is a § 371 National Stage Application of PCT International Application No. PCT/EP2018/063866 filed May 28, 2018 claiming priority to EP 17178933.2 filed Jun. 30, 2017.

FIELD OF THE INVENTION

The present invention relates to a cutting insert according to the preamble of claim 1. In particular, but not exclusively, the invention relates to a cutting insert configured for chip-removing machining of a workpiece by means of turning. The invention also relates to a method of manufacturing a cutting insert according to the preamble of the independent method claim.

BACKGROUND AND PRIOR ART

For chip-removing machining of materials such as grey cast iron, aluminium alloys with high silicon content, Metal Matrix Composites (MMC), fibreglass, fibreboard, wood laminates and hardened materials, such as case-hardened steel, it is often desirable to use a cutting insert that has a cutting edge made of a superhard material comprising polycrystalline cubic boron nitride (PCBN) or polycrystalline diamond (PCD). Such cutting inserts offer excellent hot hardness, toughness and chemical stability.

It is possible to make the cutting insert either entirely from PCBN or PCD, but this is relatively expensive, or to make a small superhard sintered body comprising PCBN or PCD, which is thereafter brazed onto a cemented carbide body to form a cutting insert blank. The cutting insert blank is thereafter ground to form peripheral surfaces including chamfers. A chip breaker is also formed in the chamfer, inside the cutting edge. The chip breaker provides improved chip formation and control and is therefore important in order to achieve high productivity and safe working conditions for turning tool operators.

With cemented carbide cutting inserts, which are possible to produce by powder metallurgy processes such as pressing and sintering, it is possible to provide a chip breaker in the cutting insert already during pressing. However, this is not possible for superhard materials comprising PCBN or PCD, in which cases the chip breaker typically has to be formed by grinding. The design options for the chip breaker are thereby limited, and thereby also the possibilities to control the chip formation and flow of the cutting insert. With poor chip control, high temperatures arise during machining, which poses a problem in particular for cutting inserts having a small superhard sintered body brazed to a larger cemented carbide body. In such cutting inserts, the high temperatures may lead to softening of the braze joint between the bodies, thereby leading to reduced strength of the cutting edge. Furthermore, the wear process of the cutting insert becomes more difficult to predict. The cutting speed therefore has to be reduced in order to avoid detachment or damage of the superhard sintered body. High temperatures may also lead to additional chip deformation, which in turn may damage or break the cutting edge.

WO2008093592 discloses a cutting insert having a corner portion made from a PCBN material, with a chip breaker provided in a chamfer inside the cutting edge. The chip breaker has a chip breaker bottom forming a plane, and a chip breaker wall extending from the chip breaker bottom to an upper portion of the chamfer. In a plane parallel to the top surface, the chip breaker wall follows a smoothly curved convex path. The curved path contributes to improved chip control.

SUMMARY OF THE INVENTION

It is a primary objective of the present invention to provide a cutting insert with a cutting edge made of a superhard material comprising polycrystalline cubic boron nitride (PCBN) or polycrystalline diamond (PCD), which cutting insert offers an improved chip formation and control in comparison with known cutting inserts of this type. A second objective is to provide an improved way of manufacturing a cutting insert such that improved chip formation and control can be achieved.

At least the primary objective is according to a first aspect of the invention achieved by means of the initially defined cutting insert having the characterising features defined in claim 1. According to another aspect of the invention, the above mentioned second objective is achieved by means of the initially defined method, having the characterising features defined in the independent method claim.

The cutting insert according to the invention comprises:
an upper side comprising a top surface around which at least one chamfer extends,
a lower side comprising a bottom surface, wherein a centre axis extends perpendicularly through the top surface and the bottom surface,
a side surface extending between the upper side and the lower side,
at least one cutting edge formed in a corner region of the cutting insert in a transition between the side surface and the at least one chamfer, wherein at least the corner region comprises a superhard sintered body comprising polycrystalline cubic boron nitride or polycrystalline diamond,
a chip breaker formed in the at least one chamfer inside of the cutting edge, extending between a lower chamfer portion of the at least one chamfer close to the cutting edge and an upper chamfer portion of the at least one chamfer close to the top surface,
wherein the chip breaker comprises a chip breaker bottom connected to the lower chamfer portion, and a chip breaker wall extending at least partly from the upper chamfer portion to the chip breaker bottom, wherein an upper transition is formed above the chip breaker wall, extending at least partly between the upper chamfer portion and the chip breaker wall, and wherein, as seen in a top view, the upper transition follows a smoothly curved path comprising a convex middle portion extending inside a nose radius portion of the cutting edge. Furthermore, as seen in a section perpendicular to the cutting edge, the chip breaker wall and chip breaker bottom together form a smooth concave profile.

The proposed method of manufacturing comprises:
forming at least one superhard sintered body,
optionally, brazing the at least one superhard sintered body onto a pre-shaped cemented carbide body to form an insert blank,
grinding the at least one superhard sintered body or the insert blank to form the top surface, the bottom surface, the side surface and the at least one chamfer,
forming the chip breaker in the at least one superhard sintered body,
wherein laser etching is used in the forming of the chip breaker.

The chip breaker of the proposed cutting insert has a smoothly curved shape both as seen in a top view, or in a projection of the upper transition on a plane having a normal vector parallel to the centre axis, and as seen in a section perpendicular to the cutting edge, such as in a bisecting plane of the cutting edge, i.e. a bisector of a nose radius edge portion. In the section perpendicular to the cutting edge, the chip breaker wall and the chip breaker bottom are smoothly connected without sharp corners thanks to the smooth concave profile formed by the chip breaker wall and the chip breaker bottom. The smooth concave profile comprises an inwardly bent curve. The smooth concave profile may comprise such an inwardly bent curve in the form of a circular arc, but it may also be another smooth curve such as an elliptic arc, a parabolic curve, a hyperbolic curve or a combination thereof. The size of the curvature of the inwardly bent curve can be constant but it can also vary along the extent of the smooth concave profile such that the size of the curvature becomes smaller or bigger the closer to the convex middle portion. The chip breaker wall may also, as seen in the section perpendicular to the cutting edge, comprise a linear portion above the inwardly bent curve, smoothly connected to the inwardly bent curve. The linear portion of the chip breaker wall may extend at a linear portion angle ε with respect to the top surface, wherein the size of the linear portion angle s may vary along the extent of the linear portion along the smoothly curved path. The smooth shape of the chip breaker is possible to achieve thanks to that laser etching is used to form the chip breaker. Thereby, the shape of the chip breaker is not limited to what is possible to achieve by means of grinding. Instead, the chip breaker may be designed with a smooth shape tailored for the intended application of the cutting insert.

The upper transition between the upper chamfer portion and the chip breaker wall, and in some embodiments also in part directly between the top surface and the chip breaker wall, is preferably a smoothly rounded transition being radius shaped but it can have shape of a part of an ellipse, a parabola or similar. In the cases where the upper transition has a portion extending between the top surface and the chip breaker wall, this portion may typically be located directly inside a nose radius portion of the cutting edge.

A lower transition between the chip breaker bottom and the lower chamfer portion is also preferably a smoothly rounded transition preferably radius shaped or a part of an ellipse, a parabola or similar. In this way, a profile from the top surface or from the upper chamfer portion to the lower chamfer portion, as seen in the section perpendicular to the cutting edge, follows a smooth curve without sharp corners.

The proposed cutting insert provides improved conditions for chip formation thanks to the smoothness of the chip breaker. The smooth concave profile formed by the chip breaker wall and the chip breaker bottom contributes to a better chip flow, smaller chip diameter, shorter chips and reduced friction in comparison with a cutting insert having a sharp transition between chip breaker wall and chip breaker bottom. The reduced friction generates less heat, thus reducing the risk of additional chip deformation and/or thermochemical wear that may otherwise damage the cutting edge. This is particularly important for a cutting insert in which the superhard sintered body is brazed onto a preshaped cemented carbide body, since large temperatures may in this case lead to a softening of the braze joint with reduced control over the wear process of the cutting insert as a consequence.

Thanks to the reduced friction and/or cutting forces generated during machining with the proposed cutting insert, the superhard sintered body may also, with maintained cutting data, be made smaller and/or thinner than in a cutting insert having a sharp transition between chip breaker wall and chip breaker bottom. Alternatively, the size of the superhard sintered body may be maintained and the cutting speed increased. Both alternatives improves the cost efficiency of the machining process.

The cutting insert according to the invention is particularly suitable for turning. Turning tends to generate relatively long chips and improved chip formation and control are therefore important.

The smoothly curved path that the upper transition follows from one end of the chip breaker to another end of the chip breaker may be formed with several radii of curvature along the path depending on the configuration of the cutting edge. The curved path is preferably, for a symmetric cutting insert geometry, symmetric with respect to a bisecting plane of the cutting edge. The curved path has a convex middle portion, i.e. its middle portion centred on the bisector protrudes toward a corner of the cutting insert with respect to surrounding portions of the curved path. The upper transition therefore roughly follows the cutting edge as seen in a top view.

The at least one chamfer may extend at a chamfer angle θ with respect to the top surface, wherein the chamfer angle θ may typically be within the range of 10-45°. The at least one chamfer may comprise only one chamfer, i.e. the upper chamfer portion and the lower chamfer portion extend at an identical chamfer angle with respect to the top surface. However, the at least one chamfer may also comprise an upper chamfer and a lower chamfer, wherein the upper chamfer comprises the upper chamfer portion and the lower chamfer comprises the lower chamfer portion. The upper chamfer may in this case extend at a smaller angle than the lower chamfer with respect to the top surface.

As earlier mentioned, the linear portion of the chip breaker wall may extend at a linear portion angle s with respect to the top surface, wherein the linear portion angle may vary within the range 85°≤ε<(180°−θ) or more preferably within the range 90°≤ε≤(170°−θ). The linear portion angle s may be selected for optimized chip flow, controlled chip diameter, adaptation of the chip breaker for different materials and adaption of the chip breaker for the cutting date. The linear portion angle s may be constant along the chip breaker wall but it can vary such that s has smaller value along the convex middle portion than along the other parts of the smoothly curved path which is advantageous when the feed is low and the convex middle portion contributes more to the chip formation. But s can also have smaller value along a concave portion and/or along a concave end portion of the smoothly curved path compared to the value of s along the convex middle portion which is advantageous when the feed is higher and the chip formation is more influenced by the chip breaker wall parts to the right/left of the convex middle portion.

According to one embodiment, the lower chamfer portion has a width which is the same or essentially the same along the cutting edge. A lower transition between the lower chamfer portion and the chip breaker bottom thereby extends along a curve parallel with or essentially parallel with the cutting edge. The chip breaker thereby follows the cutting edge, which is beneficial for the chip formation properties of the cutting insert.

According to one embodiment, the smooth concave profile comprises a radius shaped portion. Preferably, the radius shaped portion has a radius of curvature within the range of 0.1-0.5 mm, or more preferably 0.15-0.25 mm. This is beneficial for a smooth chip flow. The value of the radius of curvature can be constant but it can also vary along the extent of the radius shaped portion such that the value becomes smaller the closer the convex middle portion where it has its minimum. Such a varying radius of curvature is beneficial for some materials and low feed. However, the value of the radius of curvature can vary such that the value becomes bigger the closer the convex middle portion where it has its maximum. Such a varying radius of curvature is beneficial for higher depths of cut and higher feed rate.

According to one embodiment, the upper transition is a radius shaped transition. The upper transition is in this embodiment a circular arc which preferably has a radius of curvature within the range of 0.02-0.2 mm as seen in the section perpendicular to the cutting edge. A smooth transition is thereby formed between the upper chamfer portion and the chip breaker wall, preventing chips from being obstructed by a sharp transition edge. Local hot spots are thereby also prevented, which may otherwise be generated as an effect of increased friction at the sharp transition.

According to one embodiment, a lower transition between the chip breaker bottom and the lower chamfer portion is a radius shaped transition. The lower transition preferably has a radius of curvature within the range of 0.01-0.2 mm as seen in the section perpendicular to the cutting edge. The smooth transition formed prevents chips from being obstructed by a sharp transition edge. According to one embodiment, the smoothly curved path comprises, on each side of the convex middle portion, a concave portion with at least one radius of curvature, i.e. an inwardly bent portion as seen in a top view. This is beneficial in particular for cutting inserts with a relatively small nose radius. The concave portion directs and forms the chips such that they can break and/or be directed away from the cutting zone, such that the chips do not struck and damage the workpiece or the cutting insert itself. The smoothly curved path may also comprise, on each side of the convex middle portion, a mix of concave and convex portions.

According to one embodiment, the smoothly curved path comprises, on each end of the chip breaker, a concave end portion, as seen in a top view. The concave end portion redirects the chips to improve the chip flow.

According to one embodiment, the concave end portion has a smaller radius of curvature than at least a neighbouring portion of the smoothly curved path. The small radius of curvature contributes to redirection of chips and may be fine-tuned depending on intended cutting application.

According to one embodiment, as seen in a top view, an angle α is formed between a main extension of the lower chamfer portion and a main extension of the chip breaker wall, wherein 10°≤α≤30°. In this embodiment, the main extension of the chip breaker wall may be understood as a line from a centre of curvature of a concave end portion of the smoothly curved path, which line tangents the convex middle portion of the path. Alternatively, depending on chip breaker design, the main extension can be described as a line from an end point of the chip breaker to a point on the chip breaker wall located close to a midpoint of the chip breaker wall. The angle α may be selected for optimized chip flow.

According to one embodiment, the chip breaker bottom forms a plane extending at an angle β with respect to a plane having a normal vector parallel to the centre axis, wherein −15°≤β<35°. The angle β should in this embodiment typically be smaller than the chamfer angle θ. If two chamfers are provided, β should be smaller than a chamfer angle of the lower chamfer. A negative angle β leads to a more positive cutting angle and a lighter cutting geometry. A positive angle β gives a stronger cutting insert with larger generated cutting forces.

According to one embodiment, the chip breaker bottom comprises surface features in the form of protrusions and/or depressions. Such surface features may be included to locally generate positive or negative cutting angles. Surface features may be included to form and to break the generated chips.

According to one embodiment, the cutting insert is entirely formed from the superhard sintered body, i.e. the cutting insert is a solid cutting insert without braze joints. Such a cutting insert is stable and is for some insert designs, such as for cutting inserts having at least three cutting edges, more cost-efficient to manufacture than a cutting insert comprising a cemented carbide body to which superhard sintered bodies are bonded.

According to one embodiment, the cutting insert comprises a cemented carbide body to which the superhard sintered body is bonded. This may be a more cost-efficient alternative to a solid PCD or PCBN cutting insert. The superhard sintered body may be bonded to the cemented carbide body by means of brazing to form an insert blank. The superhard sintered body may also be formed with a portion of cemented carbide, wherein the cemented carbide portion and the PCD/PCBN are joined during the sintering process, after which the combined sintered body is brazed onto a pre-shaped cemented carbide body to form an insert blank. Of course, the cutting insert may comprise more than one superhard sintered bodies, each located in a corner region of the cutting insert.

According to one embodiment, the cutting insert is indexable with at least two identical and alternately usable cutting edges. The cutting insert may also be double-sided with identical upper and lower sides, doubling the number of available cutting edges.

Further advantageous features and advantages of the invention will appear from the following detailed description.

BRIEF DESCRIPTION OF THE DRAWINGS

The invention will in the following be described by means of example with reference to the appended drawings, in which:

FIG. 1 shows a perspective view of a cutting insert according to a first embodiment, FIG. 2 shows a partial perspective view of the cutting insert in FIG. 1, FIG. 3 shows a partial top view of the cutting insert in FIG. 1.

DETAILED DESCRIPTION OF EMBODIMENTS OF THE INVENTION

Figure 4:
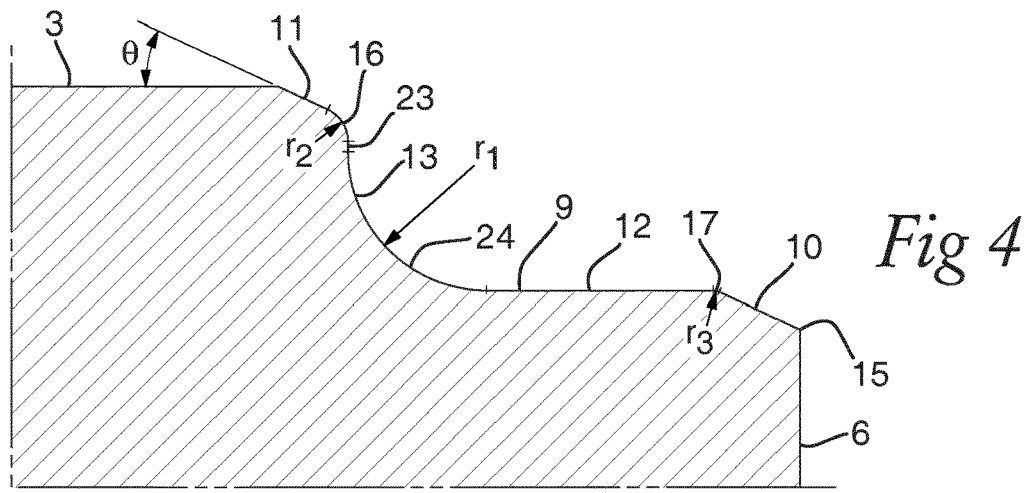
FIG. 4 shows a section along the line IV-IV in FIG. 3.

Cutting inserts according to several different embodiments are shown in FIGS. 1-18. It is to be noted that the same reference sign designates the same or a similar element in all shown embodiments.

A cutting insert 1 according to a first embodiment of the invention and intended for use in a turning tool is shown in FIG. 1. The cutting insert 1 comprises an upper side 2 with the basic shape of a parallelogram. A planar top surface 3 and a chamfer 4 extending around the top surface 3, at a chamfer angle θ of 25° with respect to the top surface 3 (see FIG. 4), are provided on the upper side 2. Opposite to the upper side 2, a lower side 5 comprising a planar bottom surface (not shown), parallel to the top surface 3, is provided. A centre axis C extends perpendicularly through the top surface 3 and the bottom surface. A side surface 6 extends between the upper side 2 and the lower side 5.

The cutting insert 1 is indexable with two alternately usable and identical cutting edges 7 provided in opposite corner regions of the upper side 2. Each cutting edge 7 is formed in a transition between the side surface 6 and the chamfer 4. For ease of understanding, only one of the corner regions will be described in detail herein.

Figure 5:
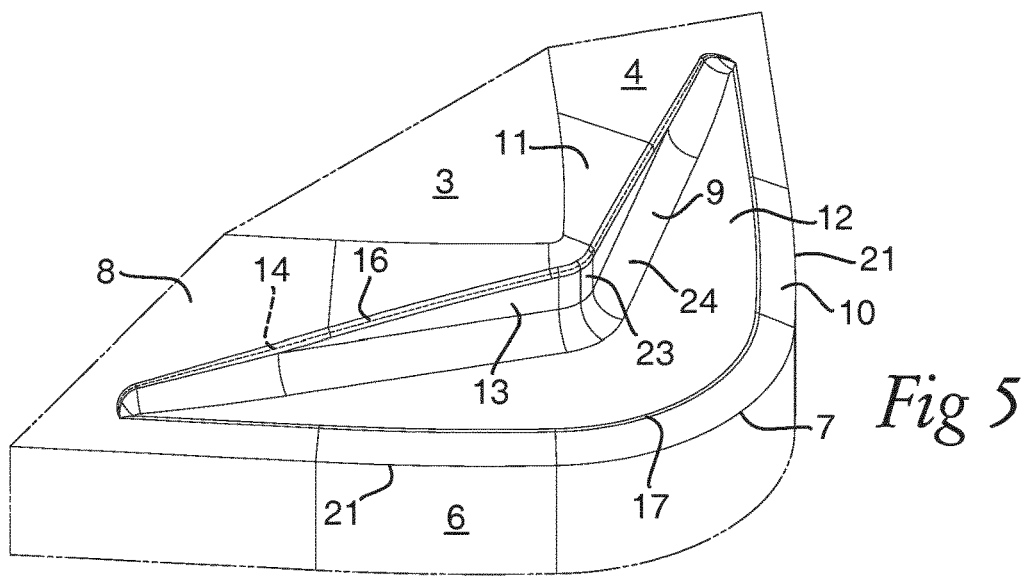
FIG. 5 shows a partial perspective view of a cutting insert according to a second embodiment.
Figure 6:
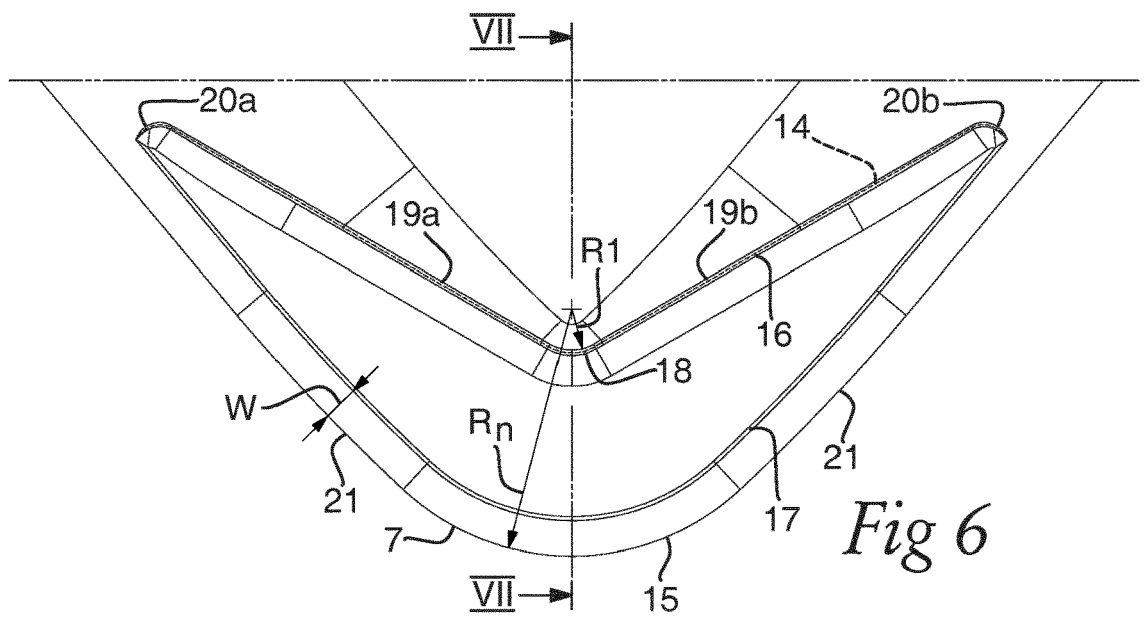
FIG. 6 shows a partial top view of the cutting insert in FIG. 5.
Figure 7:
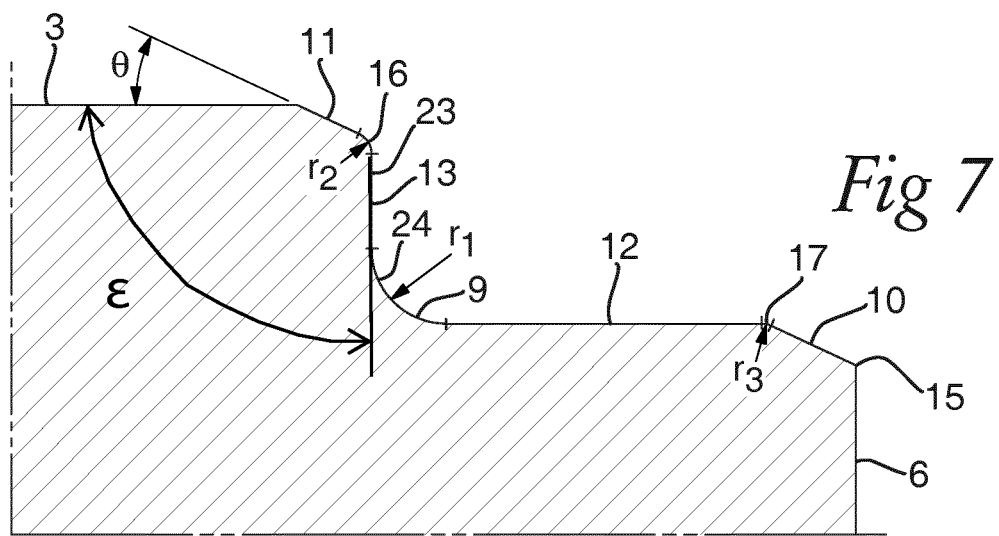
FIG. 7 shows a section along the line VII-VII in FIG. 6.

The corner region is illustrated in greater detail in FIGS. 2-4. A corner region of a cutting insert 1 according to a second embodiment is illustrated in FIG. 5-7. The cutting insert 1 according to the first and the second embodiments are identical apart from the design of the corner regions. In both embodiments, the cutting insert 1 comprises a superhard sintered body 8 comprising polycrystalline cubic boron nitride (PCBN) or polycrystalline diamond (PCD), in which the cutting edge 7 is formed and in which a chip breaker 9 is provided. The superhard sintered body 8 is in this case brazed onto a pre-shaped cemented carbide body 22.

The chip breaker 9 extends inside the cutting edge 7, closer to the centre axis C, and forms a depression in the chamfer 4. It thereby divides the chamfer 4 into a lower chamfer portion 10 close to the cutting edge 7 and an upper chamfer portion 11 close to the top surface 3, both extending at the chamfer angle θ with respect to the top surface 3. A planar chip breaker bottom 12, parallel to the top surface 3, extends inward from the lower chamfer portion 10 to a chip breaker wall 13, which in turn extends from the chip breaker bottom 12 to the upper chamfer portion 11. The lower chamfer portion 10 has a width W which is the same along the cutting edge 7. The cutting edge 7 comprises, in the first and second embodiments, a nose radius portion 15 and wiper edges 21, for generation of a smooth surface on the workpiece, formed on each side of the nose radius portion 15. In these embodiments, a nose radius $R_n$ is 1.2 mm.

The chip breaker 9 is formed as a smoothly curved surface without any sharp corners or edges where chips may be obstructed during machining.

FIGS. 4 and 7 are sectional views of a bisecting plane of the nose radius portion 15. The chip breaker wall 13 comprises a radius shaped portion 24 extending from the chip breaker bottom 12 toward the upper chamfer portion 11, so that the chip breaker wall 13 and the chip breaker bottom 12 together form a smooth concave profile. The radius shaped portion 24 is in the form of a circular arc having a radius of curvature $r_1$ of 0.2 mm (first embodiment, see FIG. 4) and 0.1 mm (second embodiment, see FIG. 7), respectively. Furthermore, an upper transition 16 in the form of a convex radius shaped transition having a radius of curvature $r_2$ of 0.05 mm (FIG. 4) and 0.03 mm (FIG. 7), respectively, is formed between the upper chamfer portion 11 and the chip breaker wall 13. A lower transition 17, also in the form of a convex radius shaped transition, having a radius of curvature $r_3$ of 0.02 mm (FIG. 4) and 0.03 mm (FIG. 7), respectively, is formed between the chip breaker bottom 12 and the lower chamfer portion 10.

In both the first and the second embodiment, but particularly in the second embodiment, the chip breaker wall 13 comprises a linear portion 23 extending between the radius shaped portion 24 and the upper transition 16 inside the nose radius portion 15. The linear portion 23 of the chip breaker wall extends at a linear portion angle s with respect to the top surface 3 (see FIG. 7). The size of the linear portion angle ε is 90°.

The upper transition 16 follows a smoothly curved path 14 without sharp corners as can be seen in the top views in FIGS. 3 and 6.

Figure 8:
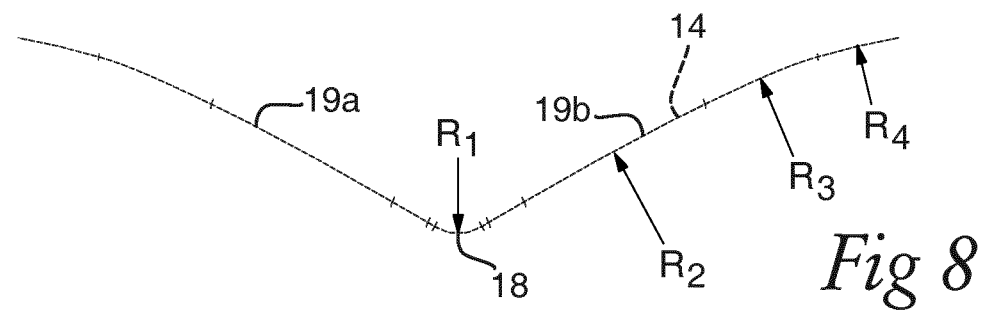
FIG. 8 shows a detail of the cutting insert shown in FIG. 1.

In the first embodiment shown in FIGS. 1-4, the smoothly curved path 14 comprises a convex middle portion 18 extending inside the nose radius portion 15 of the cutting edge 7 and having a radius of curvature $R_1$ of 0.55 mm. It further comprises concave portions 19a, 19b extending on each side of the convex middle portion 18 inside the wiper edges 21. Concave and convex are herein understood as being with respect to a point on the chip breaker bottom 12 between the respective portion and the cutting edge 7, i.e. the convex middle portion 18 is outwardly curved with respect to such a point and the concave portions 19a, 19b are inwardly curved with respect to such points, respectively. The concave portions 19a, 19b are in this embodiment formed with three different radii of curvature, $R_2$=13 mm, $R_3$=2.3 mm and $R_4$=2.2 mm. This is shown in FIG. 8, showing a projection of the smoothly curved path 14 on a plane having a normal vector parallel to the centre axis C.

Figure 9:
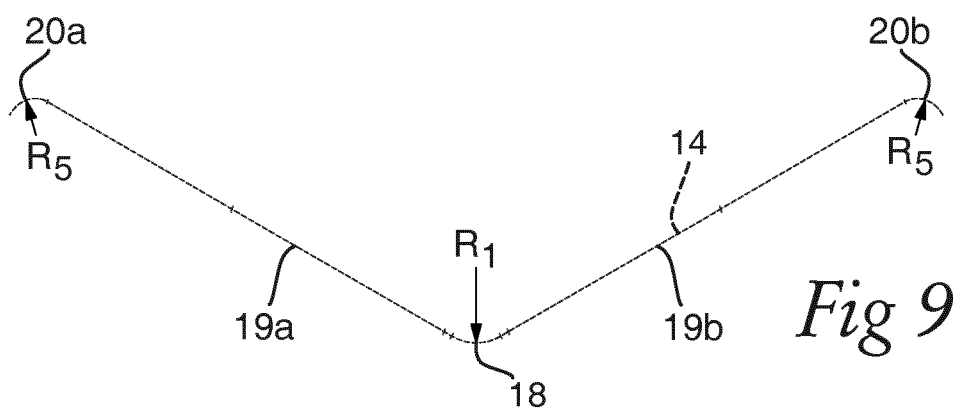
FIG. 9 shows a detail of the cutting insert shown in FIG. 5.

In the second embodiment shown in FIGS. 5-7, the smoothly curved path 14 comprises a convex middle portion 18 extending inside the nose radius portion 15 of the cutting edge 7 and having a radius of curvature $R_1$. It further comprises concave end portions 20a, 20b having a relatively small radius of curvature $R_5$ of 0.05 mm connecting the chip breaker 9 to the chamfer 4. Between the convex middle portion 18 and the concave end portions 20a, 20b, slightly concave portions 19a, 19b having a relatively large radius of curvature extend inside the wiper edges 21. A projection of the smoothly curved path 14 on a plane having a normal vector parallel to the centre axis C is shown in FIG. 9.

An angle α of 20° is formed between a main extension of the lower chamfer portion 10, i.e. of the lower transition 17, and a main extension of the chip breaker wall 13 as illustrated in FIG. 3.

The cutting insert 1 according to the first and second embodiments are suitable for high feed turning applications in which a smooth surface finish is desired.

Figure 10:
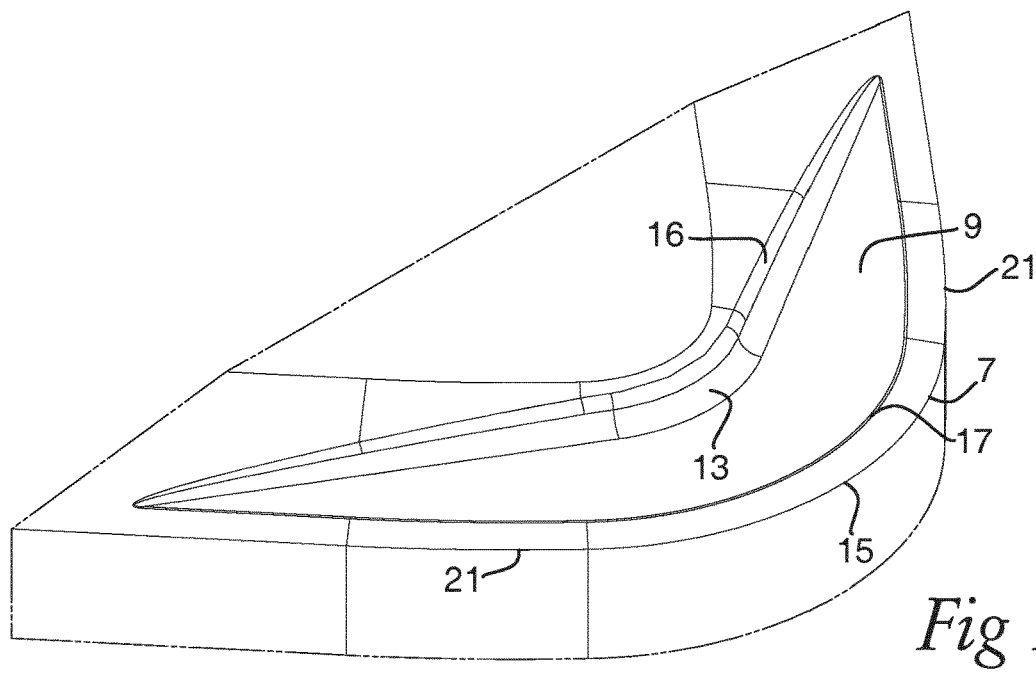
FIG. 10 shows a partial perspective view of a cutting insert according to a third embodiment.
Figure 11:
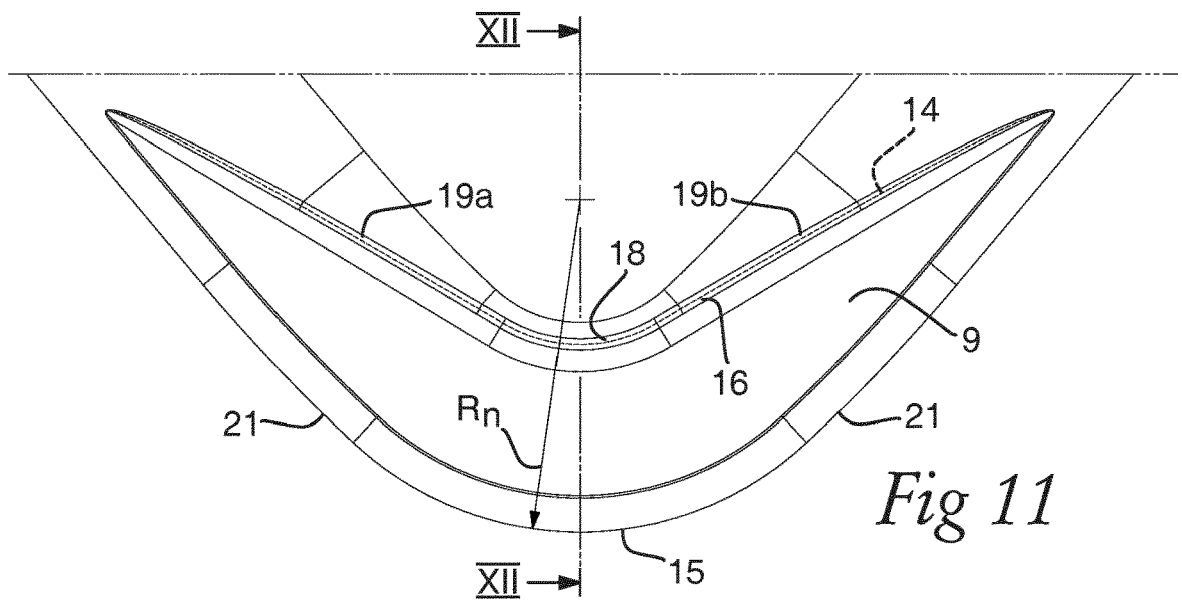
FIG. 11 shows a partial top view of the cutting insert in FIG. 10.
Figure 12:
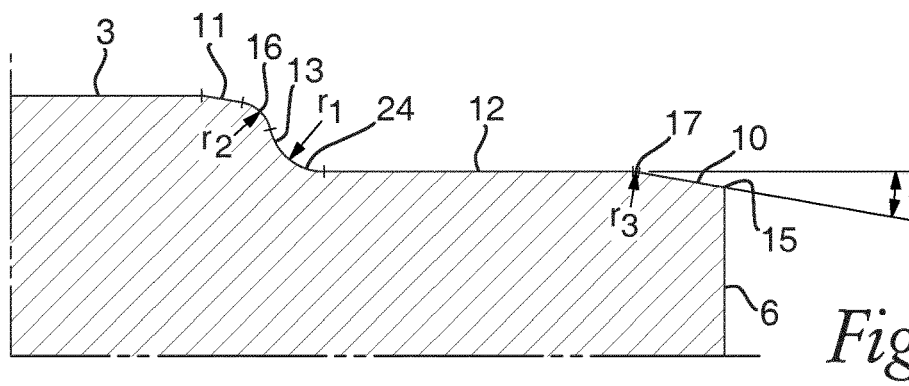
FIG. 12 shows a section along the line XII-XII in FIG. 11.

A corner region of a cutting insert 1 according to a third embodiment is shown in FIG. 10-12. The cutting insert 1 in this embodiment differs from the first and second embodiments in that the nose radius $R_n$ is larger, thus providing better surface finish and a more durable cutting edge 7. Furthermore, in this embodiment, the chamfer angle θ is 10° and the chip breaker 9 is therefore shallower, i.e. the chip breaker wall 13 is lower. The chip breaker 9 is otherwise similar to the chip breaker 9 of the first embodiment in that the smoothly curved path 14 that the upper transition 16 follows has a convex middle portion 18 inside the nose radius portion 15 of the cutting edge 7 and concave portions 19a, 19b provided on either side, inside wiper edges 21. The radius of curvature $r_2$ of the upper transition 16 is 0.05 mm and the radius of curvature $r_3$ of the lower transition 17 is 0.05 mm. The chip breaker wall 13 has, in the sectional view, a radius shaped portion 24 having a radius of curvature $r_1$ of 0.08 mm.

Figure 13:
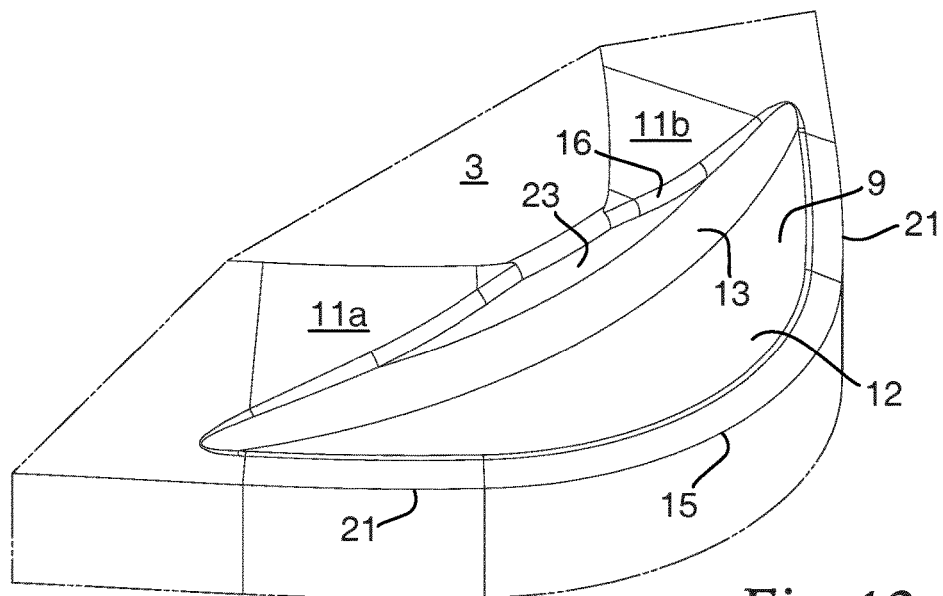
FIG. 13 shows a partial perspective view of a cutting insert according to a fourth embodiment.
Figure 14:
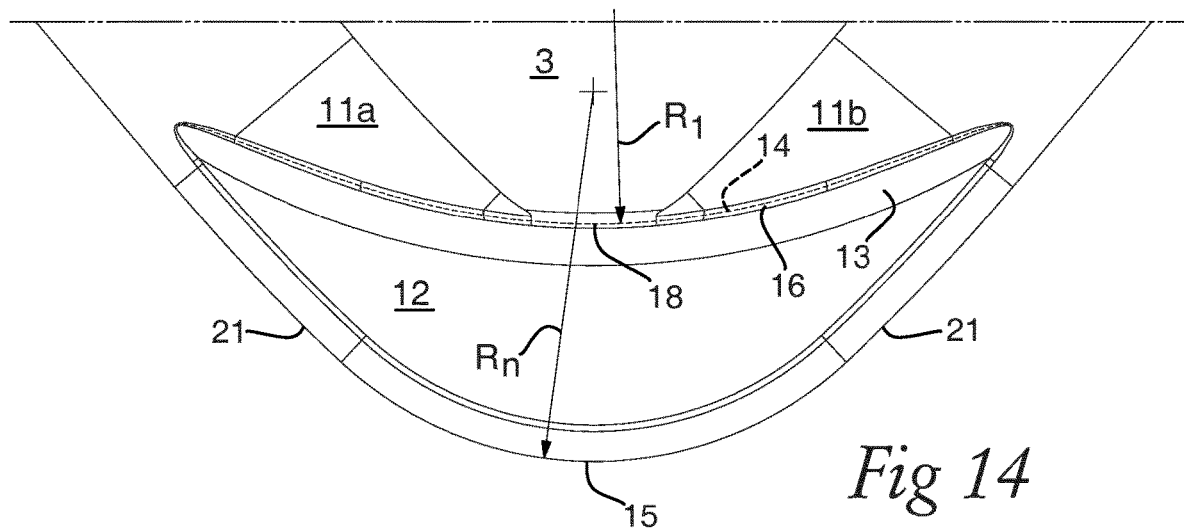
FIG. 14 shows a partial top view of the cutting insert in FIG. 13.

FIGS. 13-14 show a corner region of a cutting insert according to a fourth embodiment which is similar to the third embodiment with a large nose radius $R_n$, but with a chamfer angle θ of 25° instead of 10°. This cutting insert is particularly suitable for larger cutting depths thanks to the different design of the chip breaker 9, with a larger chip breaker bottom 12. The upper transition 16 is in this embodiment, behind a central portion of the nose radius portion 15, formed between a linear portion 23 of the chip breaker wall 13 and the top surface 3. Inside the wiper edges 21, the upper transition 16 is formed between the chip breaker wall 13 and upper chamfer portions 11a, 11b. The smoothly curved path 14 followed by the upper transition 16 is a convex curve, wherein the convex middle portion 18 has a radius of curvature $R_1=2 R_n$. In other variants of this embodiment, the radius of curvature $R_1$ may be within the range of 1.2 $R_n \leq R_1 \leq 5 R_n$.

Figure 15:
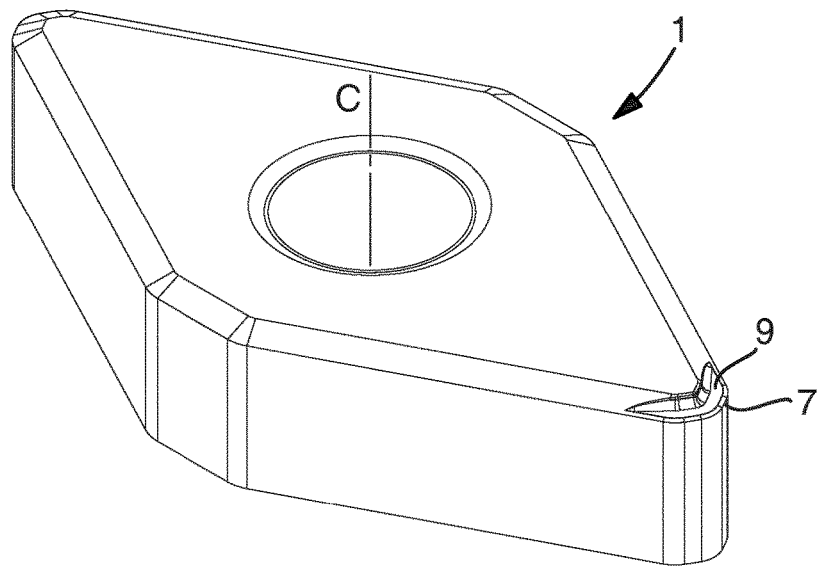
FIG. 15 shows a perspective view of a cutting insert according to a fifth embodiment.
Figure 16:
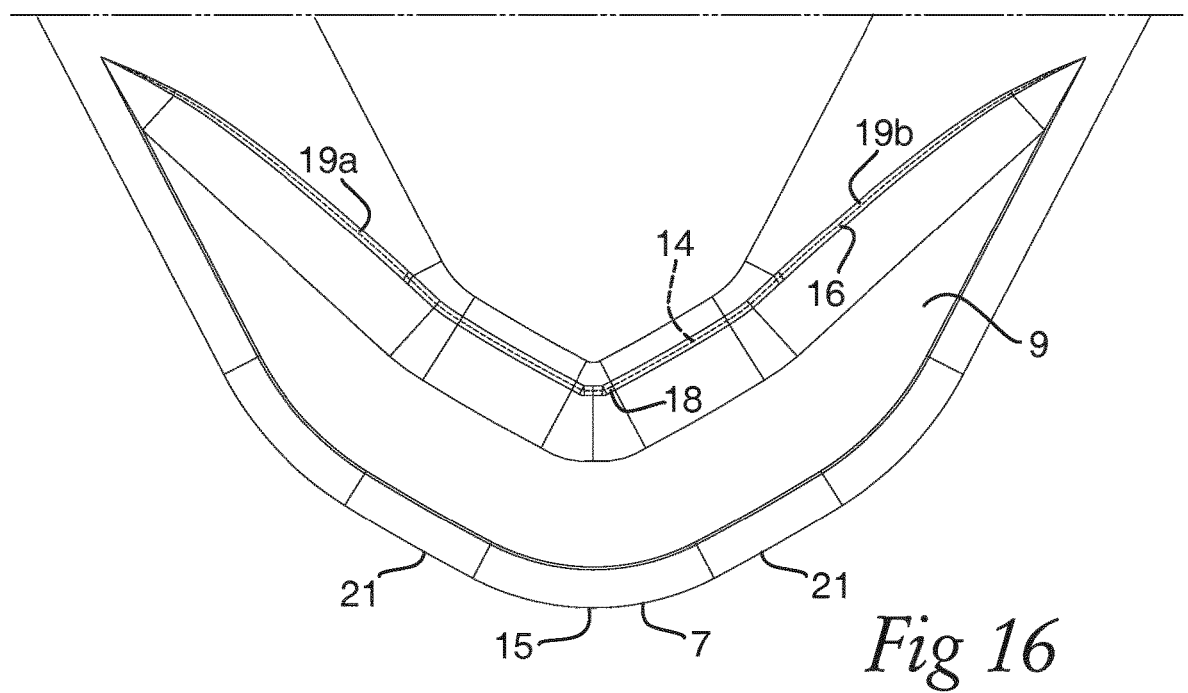
FIG. 16 shows a partial top view of the cutting insert in FIG. 15.

FIGS. 15-16 show a cutting insert 1 according to a fifth embodiment, in which the cutting insert has a more elongated rhombic shape suitable for turning of workpieces having several different radii. The cutting edge 7 comprises a nose radius portion 15 and wiper edges 21 for surface finishing. The smoothly curved path 14 followed by the upper transition 16 of the chip breaker 9 has a convex middle portion 18 and concave portions 19a, 19b provided on either side. Furthermore, the cutting insert 1 in this embodiment differs from the above discussed embodiments in that it is formed as a solid cutting insert 1, i.e. it is entirely formed from PCD or PCBN.

Figure 17:
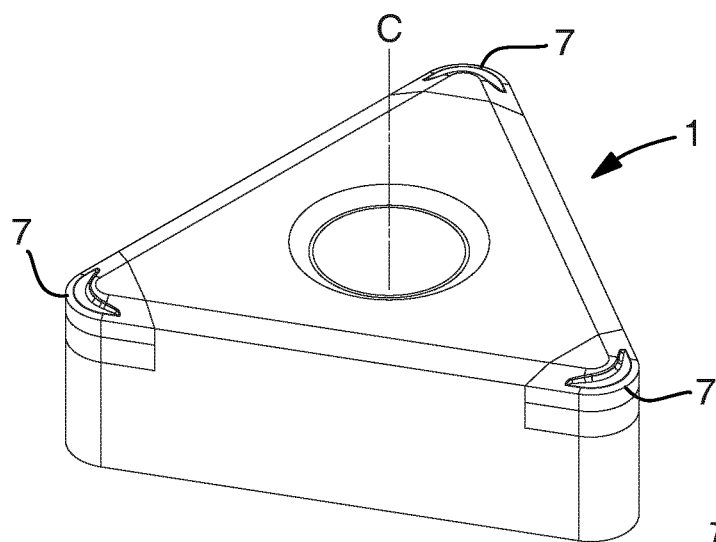
FIG. 17 shows a perspective view of a cutting insert according to a sixth embodiment.
Figure 18:
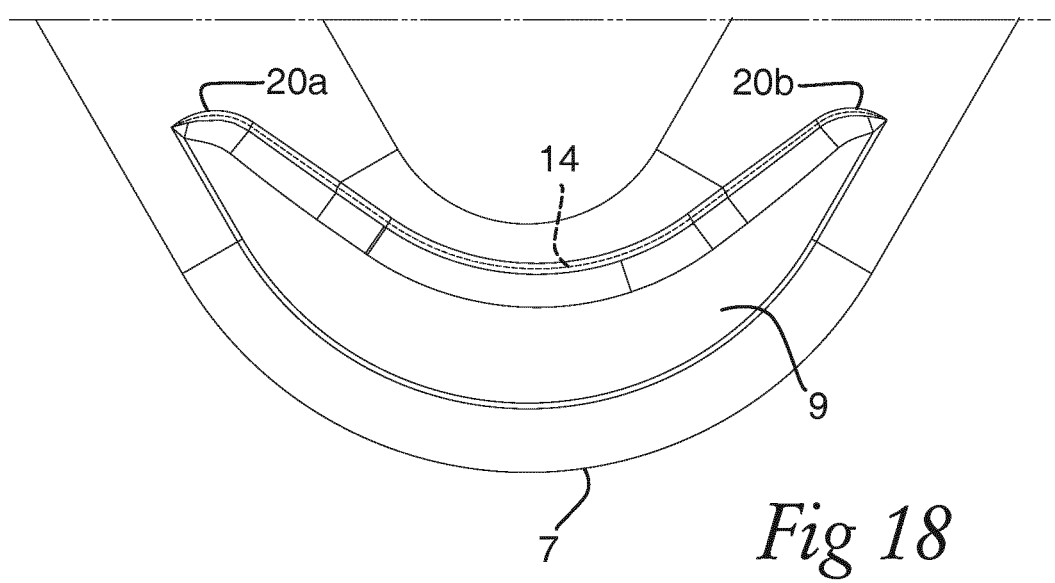
FIG. 18 shows a partial top view of the cutting insert in FIG. 17.

FIGS. 17-18 show a cutting insert 1 according to a sixth embodiment. The cutting insert 1 has a trigonal shape with three cutting edges 7 without wiper edges. The chip breaker 9 has a rounded shape and the smoothly curved path 14 is convex with concave end portions 20a, 20b. The chamfer angle θ is in this embodiment 20°.

Figure 19:
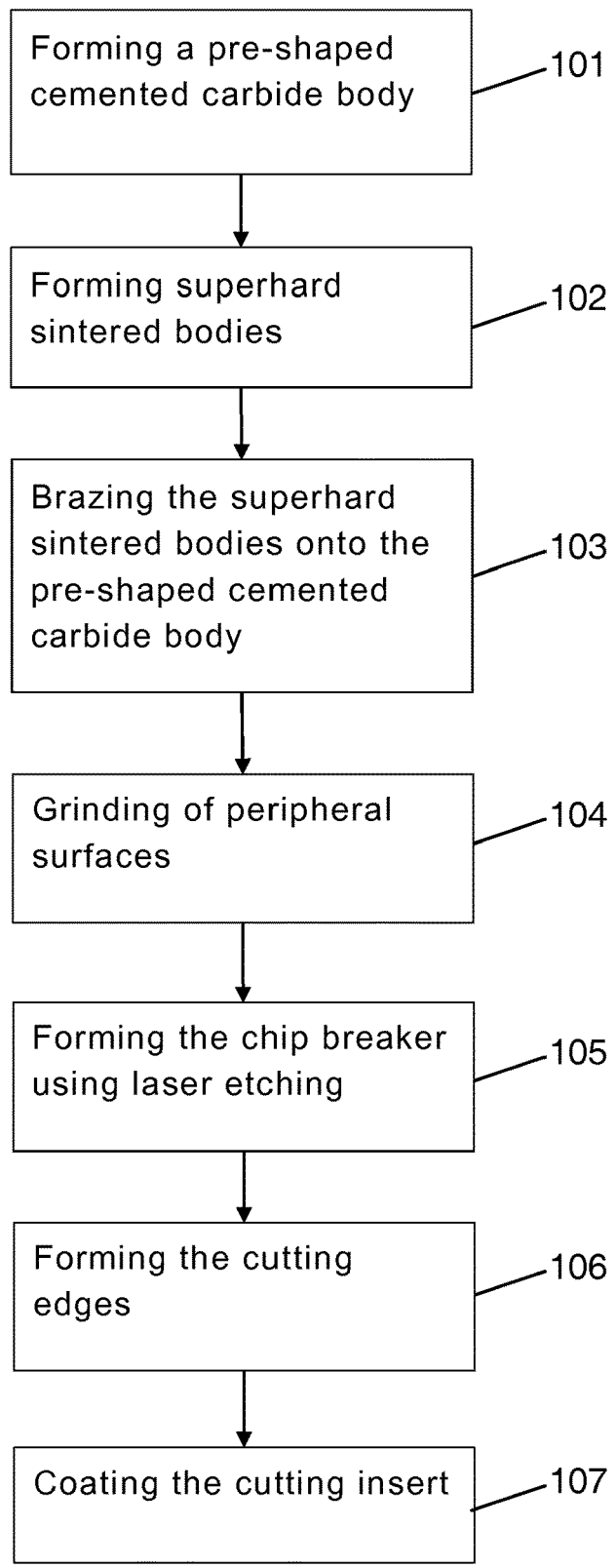
FIG. 19 is a flow chart illustrating a method of manufacturing a cutting insert according to an embodiment.

A method of manufacturing a cutting insert according to an embodiment of the invention is illustrated in the flow chart in FIG. 19. In order to form a cutting insert having a cemented carbide body 22 onto which superhard sintered bodies 8 are brazed, a pre-shaped cemented carbide body is formed in a step 101. The pre-shaped cemented carbide body may e.g. be formed by hot isostatic pressing, sintering and grinding to desired shape. In a separate step 102, a number of superhard sintered bodies 8, corresponding to the number of corner regions that are to comprise cutting edges 7, are formed from PCBN or PCD by means of sintering. In a subsequent step 103, the superhard sintered bodies 8 are brazed onto pre-shaped corners of the pre-shaped cemented carbide body 22 to form an insert blank. The insert blank is thereafter in a step 104 ground to form peripheral surfaces, i.e. the top surface 3, the bottom surface, the side surface 6 and the chamfer 4. In a subsequent step 105, the chip breaker 9 is formed in the superhard sintered bodies 8 using laser etching. A computerized model of the desired chip breaker 9 is used to control the laser etching equipment such that a high precision can be achieved. In subsequent steps 106 and 107, respectively, the cutting edges 7 are formed using edge honing or polishing, and the cutting insert 1 is coated using physical vapour deposition (PVD) or chemical vapour deposition (CVD). Between the mentioned steps, cleaning operations are carried out to ensure that the desired final shape and surface finish are obtained.

The superhard sintered bodies 8 can also be formed with a cemented carbide backing, in particular if the superhard material used is PCD. In this case, the cemented carbide backing and the PCD material are sintered together to form a combined body. The cemented carbide backing of the combined body and the pre-shaped cemented carbide body 22 are thereafter joined by brazing, such that an insert blank is obtained.

In order to manufacture a solid cutting insert formed in one piece from PCBN or PCD, the steps 101 of forming a pre-shaped cemented carbide body 22 and 103 of brazing the superhard sintered bodies thereto are skipped. Instead, the superhard sintered body is ground to form the peripheral surfaces before forming the chip breaker 9 using laser etching.

The invention is of course not limited to the embodiments disclosed, but may be varied and modified within the scope of the following claims.

The invention claimed is:

1. A cutting insert for a cutting tool, comprising:
   an upper side having a top surface around which at least one chamfer extends;
   a lower side including a bottom surface, wherein a centre axis extends perpendicularly through the top surface and the bottom surface;
   a side surface extending between the upper side and the lower side;
   at least one cutting edge formed in a corner region of the cutting insert in a transition between the side surface and the at least one chamfer, wherein at least the corner region comprises a superhard sintered body comprising polycrystalline cubic boron nitride or polycrystalline diamond; and
   a chip breaker formed in the at least one chamfer inside of the cutting edge, extending between a lower chamfer portion of the at least one chamfer close to the cutting edge and an upper chamfer portion of the at least one chamfer close to the top surface, wherein the chip breaker includes a chip breaker bottom connected to the lower chamfer portion, and a chip breaker wall extending at least partly from the upper chamfer portion to the chip breaker bottom, wherein a convex radius shaped upper transition is formed at an intersection between the upper chamfer and the chip breaker wall connecting the upper chamfer portion to the chip breaker wall, and wherein, as seen in a top view, the convex radius shaped upper transition follows a smoothly curved path, and includes a convex middle portion extending inside a nose radius portion of the cutting edge, wherein as seen in a section perpendicular to the cutting edge, the chip breaker wall and chip breaker bottom together form a smooth concave profile, and wherein, as seen in a section perpendicular to the cutting edge, defining a bisector of the nose radius portion, the convex radius shaped upper transition at the convex middle portion having a radius.

2. The cutting insert according to claim 1, wherein the lower chamfer portion has a width which is the same or essentially the same along the cutting edge.

3. The cutting insert according to claim 1, wherein the smooth concave profile has a radius shaped portion.

4. The cutting insert according to claim 1, wherein a lower transition between the chip breaker bottom and the lower chamfer portion is a radius shaped transition.

5. The cutting insert according to claim 1, wherein the smoothly curved path includes, on each side of the convex middle portion, a concave portion with at least one radius of curvature.

6. The cutting insert according to claim 1, wherein the smoothly curved path includes, on each end of the chip breaker, a concave end portion.

7. The cutting insert according to claim 6, wherein the concave end portion has a smaller radius of curvature than at least a neighbouring portion of the smoothly curved path.

8. The cutting insert according to claim 1, wherein, as seen in a top view, an angle $\alpha$ is formed between a main extension of the lower chamfer portion and a main extension of the chip breaker wall, wherein $10° \leq \alpha \leq 30°$.

9. The cutting insert according to claim 1, wherein the chip breaker bottom includes surface features in the form of protrusions and/or depressions.

10. The cutting insert according to claim 1, wherein the cutting insert is a solid cutting insert entirely formed from the superhard sintered body.

11. The cutting insert according to claim 1, wherein the cutting insert includes a cemented carbide body to which the superhard sintered body is bonded.

12. The cutting insert according to claim 1, wherein the cutting insert is indexable with at least two identical and alternately usable cutting edges.

13. A method of manufacturing a cutting insert according to claim 1, comprising the steps of:
   forming at least one superhard sintered body;
   grinding the at least one superhard sintered body or the insert blank to form the top surface, the bottom surface, the side surface and the at least one chamfer; and
   forming the chip breaker in the at least one superhard sintered body, wherein laser etching is used in the forming of the chip breaker.

* * * * *